(12) United States Patent
Ruehle et al.

(10) Patent No.: US 8,997,959 B2
(45) Date of Patent: Apr. 7, 2015

(54) CLUTCH ARRANGEMENT AND TWO-SPEED GEARBOX

(71) Applicant: GETRAG Getriebe- und Zahnradfabrik Hermann Hagenmeyer GmbH & Cie KG, Untergruppenbach, DE (US)

(72) Inventors: Guenter Ruehle, Loechgau (DE); Jochen Bausch, Bietigheim (DE); Harald Sodemann, Ludwigsburg (DE); Stefan Anspann, Stuttgart (DE)

(73) Assignee: GETRAG Getriebe—und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 145 days.

(21) Appl. No.: 13/893,246

(22) Filed: May 13, 2013

(65) Prior Publication Data

US 2013/0305861 A1    Nov. 21, 2013

(30) Foreign Application Priority Data

May 19, 2012    (DE) .......................... 10 2012 010 170

(51) Int. Cl.

| F16H 57/021 | (2012.01) |
| F16H 3/089 | (2006.01) |
| F16D 25/10 | (2006.01) |
| F16D 13/52 | (2006.01) |
| F16D 13/58 | (2006.01) |
| F16D 21/04 | (2006.01) |
| F16D 25/08 | (2006.01) |

(52) U.S. Cl.
CPC ............... *F16D 13/52* (2013.01); *F16D 13/58* (2013.01); *F16D 21/04* (2013.01); *F16D 25/082* (2013.01); *F16D 25/10* (2013.01); *F16H 57/021* (2013.01); *F16H 3/089* (2013.01); *F16H 2200/0034* (2013.01)

(58) Field of Classification Search
USPC ............. 192/48.603, 48.606, 48.607, 48.611, 192/85.49; 74/340
See application file for complete search history.

(56) References Cited

U.S. PATENT DOCUMENTS

| 2,736,412 | A | * | 2/1956 | Livezey ................... 192/48.611 |
| 2007/0215430 | A1 | | 9/2007 | Graves |
| 2007/0240961 | A1 | * | 10/2007 | Gremplini et al. ......... 192/87.11 |
| 2011/0290610 | A1 | * | 12/2011 | Arnold et al. ................ 192/48.1 |
| 2012/0024655 | A1 | | 2/2012 | Clapp |

FOREIGN PATENT DOCUMENTS

| DE | 20 2005 019 438 U1 | 5/2007 |
| DE | 10 2011 051 401 A1 | 2/2012 |

* cited by examiner

*Primary Examiner* — Richard Lorence
(74) *Attorney, Agent, or Firm* — Knobbe Martens Olson & Bear, LLP

(57) ABSTRACT

Clutch arrangement for a motor vehicle gearbox. The clutch arrangement has a housing and a clutch. The clutch is arranged in the housing and is arranged concentrically with a shaft, which extends in a longitudinal axis. The shaft is supported on the housing by means of a first shaft bearing adjacent to the clutch and by means of a second shaft bearing spaced at an axial distance from the clutch. The clutch arrangement has an actuator arrangement for actuating the clutch. The actuator arrangement is designed to exert an actuating force on the clutch in a first longitudinal direction. The actuator arrangement here being axially braced on the housing and a force flux being introduced into the shaft as a result of the actuating force. The first shaft bearing is arranged so that the force flux introduced into the shaft can be axially braced on the housing by way of the first shaft bearing.

13 Claims, 2 Drawing Sheets

CLUTCH ARRANGEMENT AND TWO-SPEED GEARBOX

CROSS-REFERENCE TO RELATED APPLICATIONS

This application claims the priority of German patent application DE 10 2012 010 170, filed May 19, 2012.

BACKGROUND OF THE INVENTION

The present invention relates to a clutch arrangement, particularly for a motor vehicle gearbox, having a housing, having a clutch which is arranged in the housing and which is arranged concentrically with a shaft, which extends in a longitudinal axis, the shaft being supported on the housing by means of a first shaft bearing adjacent to the clutch and by means of a second shaft bearing spaced at an axial distance from the clutch, and having an actuator arrangement for actuating the clutch, the actuator arrangement being designed to exert an actuating force on the clutch in a first longitudinal direction, the actuator arrangement here being axially braced on the housing and a force flux being introduced into the shaft as a result of the actuating force.

Clutch arrangements of this type are known in the field of automotive engineering, for example in the form of power-shift clutches. In this case the clutch may be a wet multi-disk clutch, for example. When such clutches are actuated, relatively high axial forces are generated, which on the one hand in the actuator arrangement are introduced into the housing, and on the other hand into the shaft.

The actuator arrangement may be a hydraulic actuator arrangement, for example.

Although the housing is usually of relatively rigid construction, the ensuing actuating times of such power-shift clutches are in practice often long, which may be disadvantageous in terms of controllability and operating reliability.

BRIEF SUMMARY OF THE INVENTION

An object of the invention, therefore, is to specify an improved clutch arrangement, which advantageously overcomes at least one of the disadvantages described above.

In the clutch arrangement mentioned at the outset, the aforesaid object is achieved in a first aspect of the invention in that the first shaft bearing is arranged so that the force flux introduced into the shaft can be axially braced on the housing by way of the first shaft bearing.

Consequently these forces can be reintroduced from the shaft directly into that portion of the housing which is adjacent to the clutch, so that the forces can be counterbalanced by the bracing force.

It is therefore possible to ensure that no major deformations of the housing occur, even if the housing is not of particularly rigid construction. This in turn means that the reaction times of the actuator arrangement can be substantially improved, which may also be of great significance from technical safety standpoints (rapid opening of the clutch in the event of a failure).

In the prior art an arrangement of two angular-contact tapered roller bearings, which form an X arrangement, are used to support the shaft. In this design the forces introduced into the shafts are carried into the housing via the axially spaced shaft bearings. The forces generated by the actuating force and acting on opposite axial ends are therefore introduced into the housing, which leads to an elastic deformation of the housing, and consequently also to a variation in the volume of the fluid, by means of which the clutch is actuated. Since in hydraulic applications even very small variations in volume can result in marked variations in pressure and force, in the prior art it is necessary to build either extremely stable housings and/or pumps with a very large delivery capacity.

Through the inventive introduction of forces, carried into the shaft, directly into an adjacent portion of the housing, the force can be compensated for at the same axial end of the housing, so that substantially no volumetric variation, or no volumetric variation at all, occurs in the cylinder volume of a hydraulic actuator arrangement, when the latter exerts forces on the clutch.

Furthermore, if need be, the clutch arrangement can be built to take up no more overall space than conventional clutch arrangements.

The object is therefore achieved in full.

It is generally possible to design shaft bearings so that they form a fixed-free bearing, the first shaft bearing in this case preferably being the fixed bearing, in order to be able to introduce the forces into the housing immediately adjacent to the actuator arrangement.

According to an especially preferred embodiment the first shaft bearing and the second shaft bearing form an O arrangement.

In this case the shaft bearings are preferably embodied as set tapered roller bearings or angular-contact ball bearings.

The O arrangement allows forces introduced into the shaft, which are in particular directed away from the first shaft bearing, to be carried into the housing by way of the first shaft bearing, where they can be counterbalanced by the bracing forces.

It is furthermore advantageous overall if the housing comprises a housing cover in the area of each of the two longitudinal ends of the shaft.

Whilst a single housing cover is sufficient in the case of a shaft bearing with an X arrangement, since the bearing remote from the cover can be pre-fitted to the shaft, and the bearing close to the cover can be fitted before closing the housing cover (or is likewise pre-fitted), in the case of a shaft bearing in an O arrangement, access to the housing via housing covers from both longitudinal ends is advantageous, since in this case one shaft bearing can be fitted by way of the one housing cover and the assembly cover of the other shaft bearing can be fitted by way of the other housing cover.

At least one of the housing covers has a diameter less than half the overall diameter of the housing. The housing covers are preferably designed as assembly covers and do not form halves of the housing or housing covers, which close a housing pod.

It is furthermore preferable, overall, if the clutch arrangement comprises a further clutch, which is arranged in the housing and is arranged concentrically with the shaft, the further clutch being arranged adjacent to the second shaft bearing and at a distance from the first shaft bearing, and if the clutch arrangement comprises a further actuator arrangement for actuating the further clutch, the further actuator arrangement being designed to exert a further actuating force on the further clutch in a second longitudinal direction opposed to the first longitudinal direction, the further actuator arrangement here being axially braced on the housing and a force flux being introduced into the shaft as a result of the further actuating force, and the second shaft bearing being arranged so that the force flux introduced into the shaft as a result of the further actuating force can be axially braced on the housing by way of the second shaft bearing.

In this embodiment the clutch arrangement may be of substantially mirror-symmetrical design, the one clutch with the one actuator arrangement being arranged in the area of one end of the shaft, and the further clutch and the further actuator arrangement being arranged at the other longitudinal end of the shaft. Furthermore, the one clutch and the one actuator arrangement are preferably arranged in the area of one longitudinal end of the housing, and the further clutch and the further actuator arrangement are preferably arranged in the area of the other longitudinal end of the housing.

Consequently the one clutch and the further clutch are capable of shifting, preferably power-shifting, two power flows, in such a way that a power flow ensues either via the one clutch or via the other clutch, and the two clutches preferably also being cable of actuation with an overlap, in order to be able to perform power flow shifts without interrupting the power flow.

According to a further aspect the aforesaid object in connection with the clutch arrangement mentioned at the outset is achieved in that the housing comprises at least two housing elements connected in a longitudinal direction, the housing elements being connected to one another by way of a tension bolt, which acts on the housing elements in the area of the shaft bearings.

The tension bolt also serves to reduce an elastic deformation of the housing parts in relation to one another. In this aspect it is advantageous for the first shaft bearing and the second bearing to be able to form an X arrangement, so that the overall assembly can be simplified. It is furthermore possible to provide a housing cover on just one of the housing elements, or on neither of the housing elements. In this variant a further housing cover is preferably not required.

It is especially preferred here if the shaft is embodied as a hollow shaft, through which the tension bolt extends.

This measure serves to simplify the design of a connection of the housing halves in the area of the shaft bearings and facilitates the assembly process.

In the first aspect, on the other hand, the shaft may be designed as a solid shaft or as a hollow shaft, components supported on the shaft in the clutch arrangement according to the first aspect being more easily supplied with lubricating oil and/or cooling oil, since in this variant there is preferably no tension bolt occupying a hollow shaft.

The following preferred embodiments relate to both aspects of the invention.

As mentioned, the actuator arrangement is preferably a hydraulic actuator arrangement.

The actuator arrangement here may comprise a piston/cylinder arrangement. The piston may be formed rotationally fixed to a member of the clutch. In this case it may be necessary to deliver hydraulic fluid to the cylinder chamber by way of rotary guides or the like for actuation of the piston.

It is especially preferred, however, if the actuator arrangement comprises a piston, which is supported on the housing so that it is axially displaceable and which is coupled to the clutch by a piston axial bearing.

In this embodiment the piston/cylinder arrangement of the actuator arrangement is fixed to the housing and is actuated by way of the piston axial bearing.

Here the axially displaceable piston may be supported directly in the housing, or in a cylinder, which is firmly connected to the housing.

It is generally preferable for the actuator arrangement to be arranged as close as possible to the first shaft bearing, and in particular aligned with this in an axial direction.

It is especially preferable for the first shaft bearing to be separated from the actuator arrangement by an annular housing portion.

Here the annular housing portion may comprise a shoulder for an outer ring of the first shaft bearing, in order to allow force to be introduced into the annular housing portion. Here the annular housing portion may be connected, for example, to a housing wall, which basically extends radially and which at the same time constitutes a longitudinal end of the housing.

The housing overall may comprise two housing elements of substantially equal length, but may also comprise a housing pod, which is closed by means of a housing main cover. In particular, the housing is generally of two-part construction, the one housing cover being formed on the one housing element. In the case of the first aspect, the other housing cover is formed on the other housing element.

The clutch may be a dry power-shift clutch, but is preferably a wet clutch, in particular a multi-disk clutch.

In this case it may be advantageous for bores to be provided in the shaft, for delivering a cooling fluid such as cooling oil or the like, which serves to cool and/or to lubricate the clutch.

The present invention is also implemented by a gearbox having such a clutch arrangement, a first idler gear, which can be connected to the shaft by means of the one clutch and which is rotatably supported on the shaft, and a second idler gear, which can be connected to the shaft by means of the further clutch and which is rotatably supported on the shaft. The gearbox may be designed to adjust multiple gear steps, in particular 5, 6, 7, 8 or 9 gear steps. The gearbox is preferably embodied as a two-speed gearbox.

Here the gearbox may adjust a power flow via the first idler gear or via the second idler gear, the idler gears, in conjunction with respective fixed gears, serving to adjust two gear steps. It is furthermore possible to shift between the gear steps under load by actuating the two clutches with an overlap (that is to say with slip at certain intervals).

Overall, the present invention affords a short shift time in a clutch arranged on a shaft and/or a high rigidity of the actuator system. Furthermore, depending on the embodiment, the invention makes it possible to achieve at least one of the following advantages.

Firstly, in the first aspect, through suitable support (for example an O arrangement) in the gearbox housing, the shaft itself can act as tension bolt between two housing halves of the housing. Furthermore, it is possible to compensate for a deformation of the gearbox housing when an actuating force is exerted.

If the clutch is combined with an idler gear, axial forces of the idler gear (due to helical toothing or the like) can also be absorbed in the same gearbox housing half via the adjacent shaft bearing.

The local counterbalancing of the actuating force results in less elastic (or even plastic) deformation of the housing and less axial displacement of components inside the housing. Furthermore, it may mean that a hydraulic piston of an actuator arrangement generally has to cover a smaller actuation travel in order to exert a specific actuating force, so that a smaller volume of hydraulic oil has to be delivered for this purpose, and this can furthermore be done in a shorter time.

The rapid shift times of the clutch consequently also mean that any faults cannot lead to safety-critical situations. If the invention is implemented in a multi-speed gearbox, for example, which is a powershift gearbox, accidental actuation of two clutches may lead to a distorted state in the gearbox. Such a distorted state can be detected through corresponding measures in a gearbox control module and monitoring software. Suitable measures can be instituted to resolve this state. For safety reasons of driving stability, such a distorted state must be detected and rectified within a specific processing reliability time. Since these processing reliability times may be a few 100 ms, short actuating times with the clutch arrangement according to the invention are capable of fully meeting such driving safety requirements.

In an especially preferred variant the shaft bearing support is embodied by tapered roller bearings in an O arrangement. The force flux of a hydraulic piston can thereby be transmitted axially from the housing to the shaft by way of the clutch and an associated idler gear. By way of the tapered roller bearing fitted in an O arrangement, the shaft in turn braces this axial force in the adjacent gearbox housing wall, on which the actuator arrangement for this piston is also arranged. This and the resulting force flux compensate for the forces acting on the housing wall. An elastic deformation of the housing wall and a larger piston travel possibly occasioned by this can thereby be reduced to a minimum.

The inner rings of the tapered roller bearings can preferably be secured on the shaft by corresponding screwed connections or other axial fixings.

The clutch arrangement can be designed to take up a small overall space. If need be, a smaller hydraulic pump may be used, therefore requiring less auxiliary power. The fuel consumption of a vehicle equipped with such a gearbox can thereby be reduced.

In the case of a shaft bearing with tapered roller bearings or angular-contact ball bearings in an X arrangement, according to the second aspect, additional tension bolts, for example in the form of bolted connections, can be arranged in or around the shaft, bolting two gearbox housing halves together.

It will be obvious that the features specified above and those yet to be explained below can be used not only in the particular combination indicated but also in other combinations or individually, without departing from the scope of the present invention.

BRIEF DESCRIPTION OF THE SEVERAL VIEWS OF THE DRAWING

Exemplary embodiments of the invention are represented in the drawing and are explained in more detail in the following description. In the drawing.

DETAILED DESCRIPTION OF THE INVENTION

Figure 1:
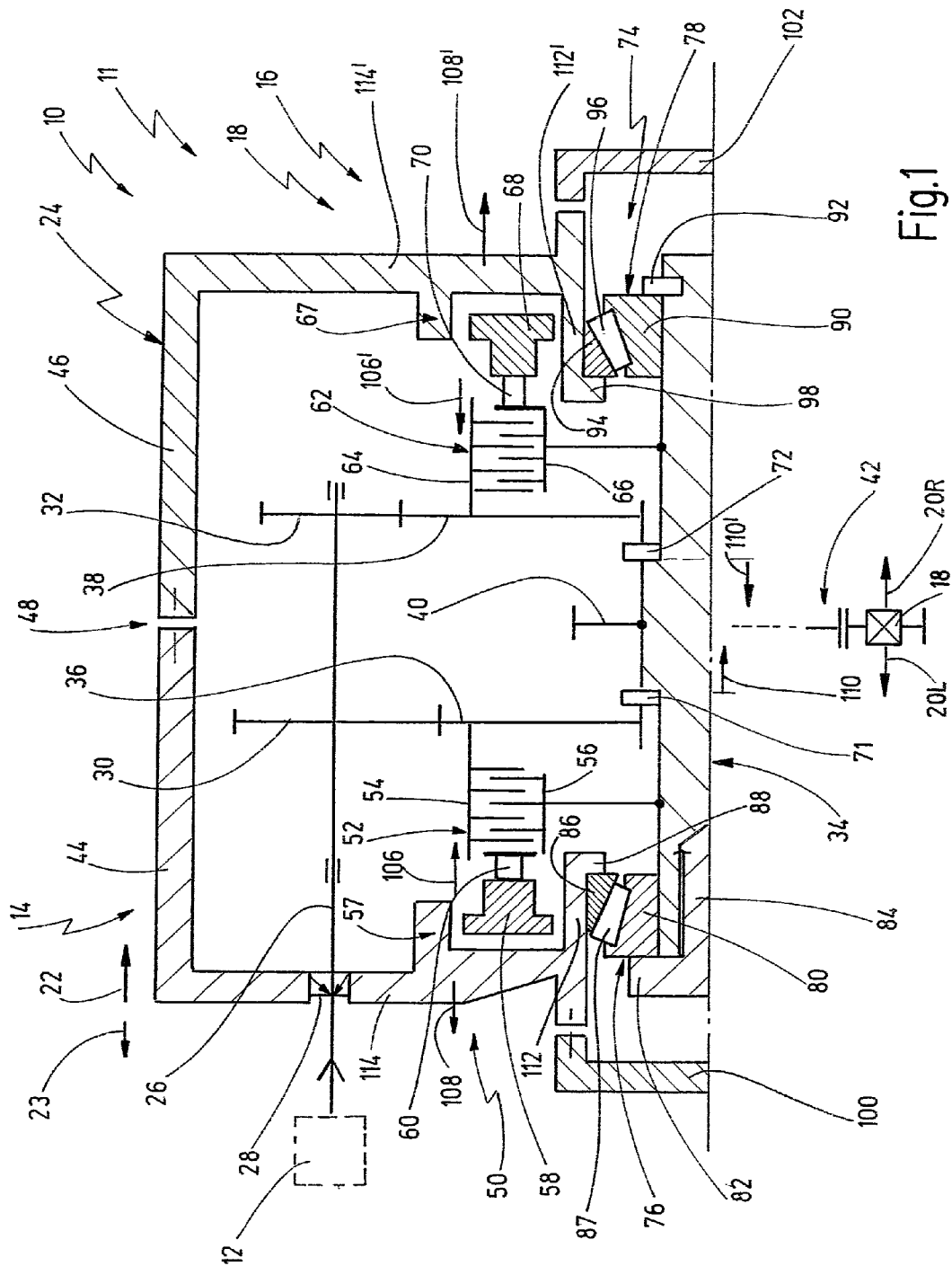
FIG. 1 shows a schematic view in longitudinal section through a two-speed gearbox having one embodiment of a clutch arrangement according to the invention.

FIG. 1 in schematic form represents a drivetrain for a motor vehicle, which is generally denoted 10. The drivetrain 10 serves for driving a motor vehicle 11, not represented further, and comprises a prime mover 12. The prime mover 12 may be an electric motor, for example, so that the vehicle is embodied as a purely electrical vehicle. The prime mover may also be a hybrid drive unit, however, for example in the form of a range-extender drive, or also a conventional internal combustion engine.

The propulsive power of the prime mover 12 is fed into a transmission arrangement 14, which comprises a two-speed gearbox 16. An output of the two-speed gearbox 16 is connected to a differential 18, which distributes propulsive power to two driven wheels 20L and 20R. In FIG. 1 a first longitudinal direction is denoted by 22. The opposite, second longitudinal direction is denoted in FIG. 1 by 23.

The two-speed gearbox 16 comprises a housing 24, which may be made from metal, for example, and is preferably produced from two housing halves.

An input shaft 26, via which the propulsive power of the prime mover 12 is introduced into the inside of the housing 24, is rotatably supported in the housing 24. The input shaft 26 is sealed off from the housing 24 by means of a seal 28. A first fixed gear 30 and a second fixed gear 32 for adjusting two different gear steps are fixed to the input shaft 26 at a distance from one another in a longitudinal direction.

An output shaft 34, which is aligned parallel to the input shaft 26, is furthermore rotatably supported in the housing 24. A first idler gear 36 and a second idler gear 38 are rotatably supported on the output shaft 34. The first idler gear 36 meshes with the first fixed gear 30. The second idler gear 38 meshes with the second fixed gear 32.

A driven gear 40, which may be part of a driven gear train 42, which is connected to an input member of the differential 18, is fixed to the output shaft 34 in the longitudinal direction between the two idler gears 36, 38.

As stated, the housing 24 comprises a first housing part 44 and a second housing part 46, which are connected to one another by a housing connection 48. The housing parts 44, 46 form opposite longitudinal ends of the housing 24, in particular housing walls (not further denoted) at axially opposite ends.

A clutch arrangement 50 is also arranged in the housing 24. The clutch arrangement 50 comprises a first friction clutch 52, which is designed to connect the first idler gear 36 to the output shaft 34, or to detach it therefrom. Here the first friction clutch 52 is embodied as a wet multi-disk clutch having a first outer disk carrier 54 and a first inner disk carrier 56. The first outer disk carrier 54 is rotationally fixed to the first idler gear 36. The first inner disk carrier 56 is rotationally fixed to the output shaft 34.

A first actuator arrangement 57 is provided for actuating the first friction clutch 52. The first actuator arrangement 57 comprises a first piston 58, which is supported so that it is displaceable in an axial direction on the first housing part 44. The first piston 58 is coupled to the first friction clutch 52 by way of a first piston axial bearing 60.

The first friction clutch 52 serves for engaging and disengaging a gear step of the two-speed gearbox 16. A further portion of the clutch arrangement 50, which is of substantially mirror-symmetrical design to the part of the clutch arrangement 50 already described, serves for engaging and disengaging a further gear step of the two-speed gearbox 16.

The clutch arrangement 50 in fact comprises a second friction clutch 62, which comprises a second outer disk carrier 64 rotationally fixed to the second idler gear 38. A second inner disk carrier 66 of the second friction clutch 62 is rotationally fixed to the output shaft 34. A second actuator arrangement 67 serves for actuating the second friction clutch 62 and comprises a second piston 68, which is axially supported so that it is displaceable on the second housing part 46.

The second piston 68 is coupled to the second friction clutch 62 by way of a second piston axial bearing 70.

The first friction clutch 52 is arranged in an axial direction between the first actuator arrangement 57 and the first idler gear 36. The second friction clutch 62 is arranged in an axial direction between the second idler gear 38 and the second actuator arrangement 67.

The first idler gear 38 is braced in an axial direction on the output shaft 34 by a first idler gear axial bearing 71. Consequently axial forces in the first longitudinal direction 22 can be introduced into the output shaft 34 by the idler gear 36. The second idler gear 38 is correspondingly axially braced on the output shaft 34 by a second idler gear axial bearing 72, in such a way that axial forces can be introduced into the output shaft 34 in the second longitudinal direction 23 by the second idler gear 38.

The output shaft 34 is rotatably supported on the housing 24 by means of a support bearing arrangement 74. For this purpose a first shaft bearing 76 is provided, which in the area of one axial end supports the output shaft 34 on the housing 24, more precisely on the first housing part 44. A second shaft bearing 78 serves to support an opposite axial end of the output shaft 34 on the housing 24, in particular on the second housing part 46.

The first shaft bearing 76 and the second shaft bearing 78 are embodied as tapered roller bearings and form an O arrangement.

The first shaft bearing 76 comprises a first inner ring 80, which is axially fixed to the output shaft 34 by a first bearing fixing 82. By way of the first bearing fixing 82, axial forces in the first longitudinal direction 22 of the output shaft 34 can be introduced into the first shaft bearing 76.

The first bearing fixing 82 may be formed by an annular element, but is preferably formed by an axial screwed connection, as is shown at 84 in FIG. 1.

The first shaft bearing 76 furthermore comprises a first outer ring 86, which is braced in an axial direction on a first housing shoulder 88 of the first housing part 44. Multiple first rolling elements 87, which here are preferably embodied as cones, are supported between the first outer ring 86 and the first inner ring 80.

The second shaft bearing 78 comprises a second inner ring 90, which is fixed to the output shaft 34 by means of a second bearing fixing 92. Here the second bearing fixing 92 is shown as an annular element, but is preferably also embodied as a screwed connection, in order to allow suitable axial clamping of the bearing in an O arrangement.

The second shaft bearing 78 further comprises a second outer ring 94, second rolling elements 96 in the form of cones being arranged between the second outer ring 94 and the second inner ring 90. The second outer ring 94 is braced in an axial direction on a second housing shoulder 98 of the second housing part 46.

For fitting the output shaft 34 it is preferred, owing to the bearing support in an O arrangement, if the first housing part 44 comprises a first housing cover 100, which is arranged concentrically with the output shaft 34, and if the second housing part 46 comprises a second housing cover 102, which is arranged concentrically with the output shaft 34.

Consequently fitting can be accomplished by inserting the shaft and then pressing the bearings in between the output shaft 34 and the first housing part 44 and the second housing part 46, and finally fastening in an axial direction by means of suitable bearing fixings 82, 92.

The force fluxes when actuating the first friction clutch 52 are described below. When the first piston 58 is moved due to a fluid pressure in a cylinder chamber between the first piston 58 and the first housing part 44, the first piston 58 presses in the first longitudinal direction 22 via the first piston axial bearing 106 on to the disk pack of the first friction clutch 52. As a result, this clutch is closed, so that the idler gear 36 is connected to the output shaft 34, in order to establish a gear step. Consequently the first piston 58 exerts a first piston or actuating force 106, which is directed in the first longitudinal direction 22, on the disk pack. At the same time the first actuator arrangement 57 here is braced on the first housing part 44, that is to say in the opposite direction, as is shown at 108 in FIG. 1.

The piston force 106 furthermore leads to a force flux acting via the first friction clutch 52 and/or the idler gear 36 on the output shaft 34, so that an axial force is exerted on the output shaft 34 in the first longitudinal direction 22, this being shown by a shaft force 110 in FIG. 1.

The shaft bearing in an O arrangement means that this shaft force 110 is introduced axially into the first shaft bearing 76 and thence via the first housing shoulder 88 into the housing part 44, where this is counterbalanced by the housing force 108. The force flux is therefore conducted so that no deformation of the housing 24 can occur.

Here the first shaft bearing 76 is aligned in an axial direction with the first actuator arrangement 57, and is preferably separated from the latter by an annular housing portion 112, which is connected to a radial portion 114 of the first housing part 44, the radial portion 114 preferably forming a first longitudinal end of the housing 24.

The corresponding force fluxes when actuating the second friction clutch 62 are represented at 106', 108', 110' in FIG. 1, the respective forces being opposed to the forces that have been described with regard to the actuation of the first friction clutch 52. In the actuation of the second friction clutch 52, the forces introduced into the output shaft 34 are introduced by way of the second shaft bearing 78 into the second housing part 46, preferably into the annular housing portion 112', which is connected to a radial portion 114' of the second housing part 46.

Figure 2:
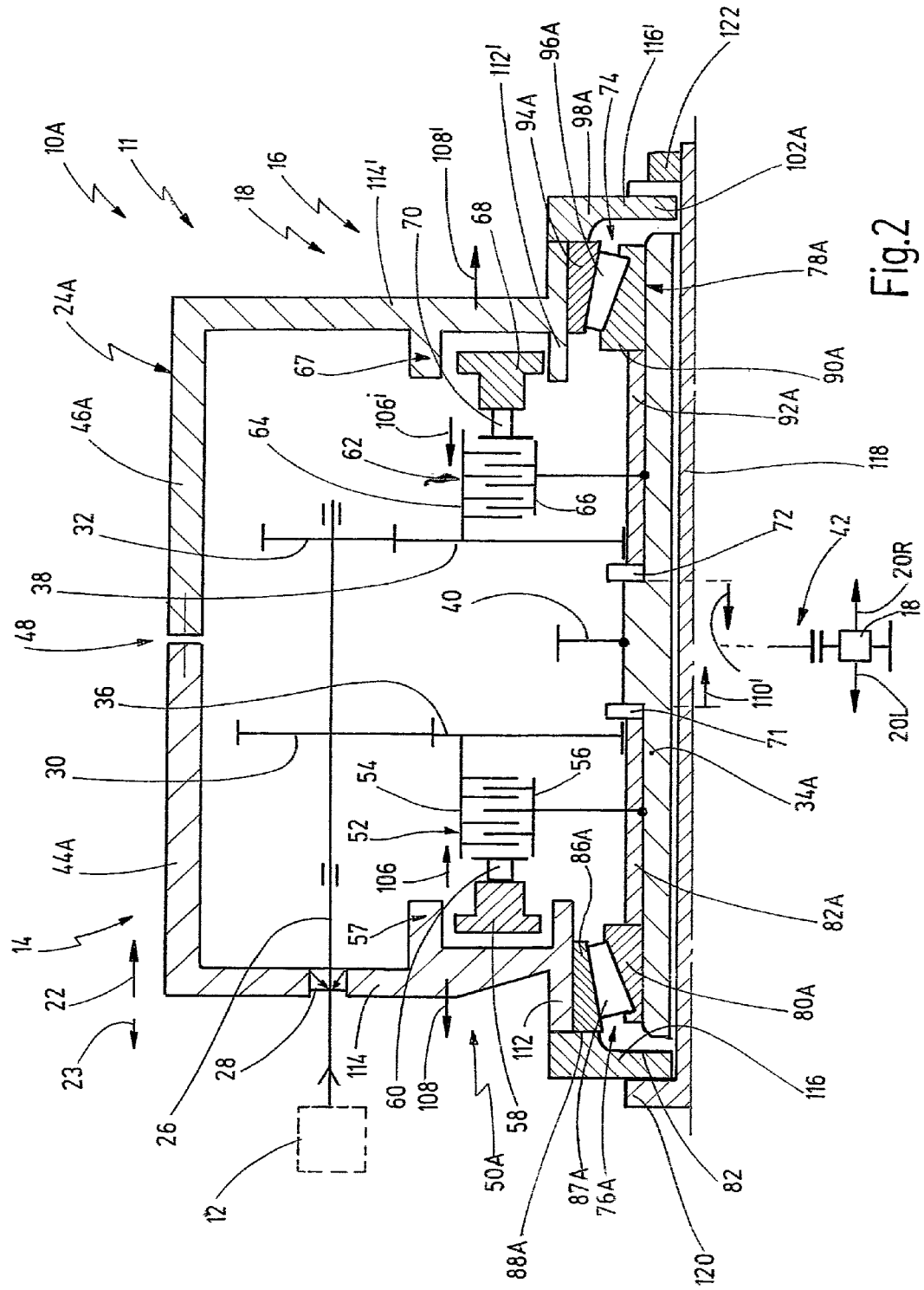
FIG. 2 shows a schematic view in longitudinal section through a two-speed gearbox having a further embodiment of a clutch arrangement according to the invention.

FIG. 2 represents a further embodiment of a drivetrain 10A with a further embodiment of a clutch arrangement 50A according to the second aspect.

The clutch arrangement 50A corresponds generally in its construction and operating principle to the clutch arrangement 50 in FIG. 1. The same elements are therefore identified by the same reference numerals. The same also applies to the drivetrain 10A as a whole, the construction and operating principle of which correspond generally to the drivetrain 10 in FIG. 1. It is basically the differences which are explained below.

In the clutch arrangement 50A the shaft 34A is embodied as a hollow shaft and is supported on the housing 24A by means of a first shaft bearing 76A and by means of a second shaft bearing 78A, the first and the second shaft bearing 76A, 78A forming an X arrangement.

Radially inside the annular housing portion 112, the one housing part 44A comprises a further radial portion 116, which extends in a radial direction towards the shaft 34A. There is preferably no housing cover 100 formed on the first housing part 44A. Radially inside the annular housing portion 112', the second housing part 46A comprises a second radial portion 116', which extends radially towards the shaft 34A. In this case the further radial portion 116' may be formed by a cover 102A.

The X arrangement means that the first outer ring 86A is braced axially in the second longitudinal direction 23 on the further radial portion 118 or on a housing shoulder 88A formed thereon. The first inner ring 80A is braced in the first longitudinal direction 22 by a first bearing fixing 82A in the form of a sleeve element on the first idler gear axial bearing 71. The second outer ring 94A is correspondingly braced in the first longitudinal direction 22 on the further radial portion 116' or on the cover 102A. The second inner ring 90A is braced in the second longitudinal direction 23 by a second bearing fixing 92A (in the form of a sleeve) on the second idler gear axial bearing 72.

A tension bolt 118 is led through the hollow shaft. This bolt is formed from a strong or high-strength material, which in particular is capable of absorbing tensile stresses. At its one end the tension bolt 118 comprises a first flange 120, which acts on the further radial portion 116. As a result the further radial portion 116 can be axially braced in the second longitudinal direction 23 on the tension bolt 118.

At the opposite end the tension bolt 118 is screw-fastened by means of a nut 122 (or directly on the second housing part 46A or the cover 102A), in such a way that the further radial portion 116' or the cover 102A (and hence the second housing part 46A) can be braced in the first longitudinal direction 22 on the tension bolt 118, in the area of the second shaft bearing 78A.

In this embodiment, too, an elastic deformation of the housing halves can be reduced, since the tension bolt acts on the housing parts 44A, 46A in the area of the shaft bearings 76A, 78A.

What is claimed is:

1. Clutch arrangement for a motor vehicle gearbox, having a housing and a clutch which is arranged in the housing and which is arranged concentrically with a shaft, which extends in a longitudinal axis, the shaft being supported on the housing by means of a first shaft bearing adjacent to the clutch and by means of a second shaft bearing spaced at an axial distance from the clutch, and having an actuator arrangement for actuating the clutch, the actuator arrangement being designed to exert an actuating force on the clutch in a first longitudinal direction, the actuator arrangement here being axially braced on the housing and a force flux being introduced into the shaft as a result of the actuating force,
wherein the first shaft bearing is arranged so that the force flux introduced into the shaft can be axially braced on the housing by way of the first shaft bearing.

2. Clutch arrangement according to claim 1, wherein the first shaft bearing and the second shaft bearing form an O arrangement.

3. Clutch arrangement according to claim 1, wherein the housing comprises a housing cover in the area of each of the two longitudinal ends of the shaft.

4. Clutch arrangement according to claim 1, having a further clutch, which is arranged in the housing and concentrically with the shaft, the further clutch being arranged adjacent to the second shaft bearing and at a distance from the first shaft bearing, and having a further actuator arrangement for actuating the further clutch, the further actuator arrangement being designed to exert a further actuating force on the further clutch in a second longitudinal direction opposed to the first longitudinal direction, the further actuator arrangement here being axially braced on the housing, a force flux being introduced into the shaft as a result of the further actuating force, and the second shaft bearing being arranged so that the force flux introduced into the shaft as a result of the further actuating force can be axially braced on the housing by way of the second shaft bearing.

5. Clutch arrangement according to claim 1, wherein the actuator arrangement comprises a piston, which is supported so that it is axially displaceable on the housing and which is coupled to the clutch by a piston axial bearing.

6. Clutch arrangement according to claim 1, wherein the first shaft bearing is separated from the actuator arrangement by an annular housing portion.

7. Clutch arrangement according to claim 1, wherein the clutch is a multi-disk clutch.

8. Clutch arrangement for a motor vehicle gearbox, having a housing and a clutch which is arranged in the housing and which is arranged concentrically with a shaft, which extends in a longitudinal axis, the shaft being supported on the housing by means of a first shaft bearing adjacent to the clutch and by means of a second shaft bearing spaced at an axial distance from the clutch, and having an actuator arrangement for actuating the clutch, the actuator arrangement being designed to exert an actuating force on the clutch in a first longitudinal direction, the actuator arrangement here being axially braced on the housing and a force flux being introduced into the shaft as a result of the actuating force,
wherein the housing comprises at least two housing elements connected in a longitudinal direction, the housing elements being connected to one another by way of a tension bolt, which acts on the housing elements in the area of the shaft bearings.

9. Clutch arrangement according to claim 8, wherein the shaft is embodied as a hollow shaft, through which the tension bolt extends.

10. Clutch arrangement according to claim 8, wherein the actuator arrangement comprises a piston, which is supported so that it is axially displaceable on the housing and which is coupled to the clutch by a piston axial bearing.

11. Clutch arrangement according to claim 8, wherein the first shaft bearing is separated from the actuator arrangement by an annular housing portion.

12. Clutch arrangement according to claim 8, wherein the clutch is a multi-disk clutch.

13. Gearbox having a clutch arrangement, the clutch arrangement comprising a housing and a clutch which is arranged in the housing and which is arranged concentrically with a shaft, which extends in a longitudinal axis, the shaft being supported on the housing by means of a first shaft bearing adjacent to the clutch and by means of a second shaft bearing spaced at an axial distance from the clutch, and having an actuator arrangement for actuating the clutch, the actuator arrangement being designed to exert an actuating force on the clutch in a first longitudinal direction, the actuator arrangement here being axially braced on the housing and a force flux being introduced into the shaft as a result of the actuating force, wherein the first shaft bearing is arranged so that the force flux introduced into the shaft can be axially braced on the housing by way of the first shaft bearing, the gearbox further having a first idler gear, which can be connected to the shaft by means of the clutch and which is rotatably supported on the shaft, and a second idler gear, which can be connected to the shaft by means of a further clutch and which is rotatably supported on the shaft.

* * * * *